(12) United States Patent
Götz et al.

(10) Patent No.: US 6,460,665 B1
(45) Date of Patent: Oct. 8, 2002

(54) PNEUMATIC SPRING ARRANGEMENT

(75) Inventors: Harald Götz; Jan Müller, both of Hamburg (DE)

(73) Assignee: Phoenix AG, Hamburg (DE)

( * ) Notice: Subject to any disclaimer, the term of this patent is extended or adjusted under 35 U.S.C. 154(b) by 0 days.

(21) Appl. No.: 09/831,716

(22) PCT Filed: Aug. 25, 2000

(86) PCT No.: PCT/DE00/02923

§ 371 (c)(1),
(2), (4) Date: May 14, 2001

(87) PCT Pub. No.: WO01/21421

PCT Pub. Date: Mar. 29, 2001

(30) Foreign Application Priority Data

Sep. 17, 1999 (DE) .......................... 199 44 587

(51) Int. Cl.$^7$ ................. F16F 9/36; F16F 9/04
(52) U.S. Cl. ............... 188/322.16; 188/322.12; 267/64.23; 267/64.27; 267/64.19
(58) Field of Search .......... 188/322.12, 322.19, 188/322.16, 298; 267/64.19, 64.23, 64.27

(56) References Cited

U.S. PATENT DOCUMENTS

| | | | |
|---|---|---|---|
| 2,522,323 A | * 9/1950 | Whisler, Jr. ............. | 188/322.12 |
| 4,154,434 A | * 5/1979 | Wallis ........................ | 137/860 |
| 4,167,992 A | * 9/1979 | McClellan ............. | 188/322.12 |
| 4,527,781 A | * 7/1985 | Pees et al. .................. | 188/315 |
| 4,529,213 A | * 7/1985 | Goodman .............. | 188/322.12 |
| 4,969,542 A | * 11/1990 | Athmer et al. ......... | 188/322.12 |
| 5,015,002 A | * 5/1991 | Goodman et al. ..... | 188/322.12 |
| 5,402,868 A | * 4/1995 | Handke et al. ........ | 188/322.12 |
| 5,472,072 A | * 12/1995 | Bumgarner ............ | 188/322.12 |
| 5,667,203 A | * 9/1997 | Romer ................... | 188/322.16 |
| 6,116,584 A | * 9/2000 | Romer ..................... | 267/64.24 |

FOREIGN PATENT DOCUMENTS

| | | |
|---|---|---|
| DE | 29 04 522 | 8/1980 |
| DE | 36 43 073 | 6/1988 |
| DE | 38 43 549 | 7/1989 |
| DE | 197 53 637 | 6/1998 |
| DE | 198 26 480 | 1/1999 |
| FR | 2 770 883 | 5/1999 |

* cited by examiner

Primary Examiner—Christopher P. Schwartz
Assistant Examiner—Robert A. Siconolfi
(74) Attorney, Agent, or Firm—Collard & Roe, P.C.

(57) ABSTRACT

The invention relates to a pneumatic spring arrangement (1) comprising at least the following components, namely a pneumatic spring lid (2), a pneumatic spring piston (3), pneumatic spring bellows (7), a vibration damper (11) with a rucksack module (14; e.g. an ADS module) and a protective collar (17) with a first connection area (B; inside diameter D1) and a second connection area (B'; inside diameter D2). The inventive pneumatic spring arrangement is characterized in that the inside diameters (D1, D2) of the first (B) and the second (B') connection area pertaining to the protective collar (17) have a size so that the protective collar can be slid over the ruck sack module (14). The excess free space within the second connection area (B') of the protective collar (17) can be filled with an adapter element (18) in a compensating manner. The adapter element (18) can be closed to from ring-shaped formation by means of a closing system and thus encompasses the end area (6) of the pneumatic spring piston (3). The novel protective collar (17) with the adapter element (18) can be used as a tire gaiter as well as a series collar.

15 Claims, 4 Drawing Sheets

PNEUMATIC SPRING ARRANGEMENT

CROSS REFERENCE TO RELATED APPLICATIONS

Applicants claim priority under 35 U.S.C. §119 of German Application No. 199 44 587.7, filed on Sep. 17, 1999. Applicants also claim priority under 35 U.S.C. §120 of PCT/DE00/02923, filed on Aug. 25, 2000. The international application under PCT article 21(2) was not published in English.

The invention relates to a pneumatic spring system as defined herein.

Figure 1:
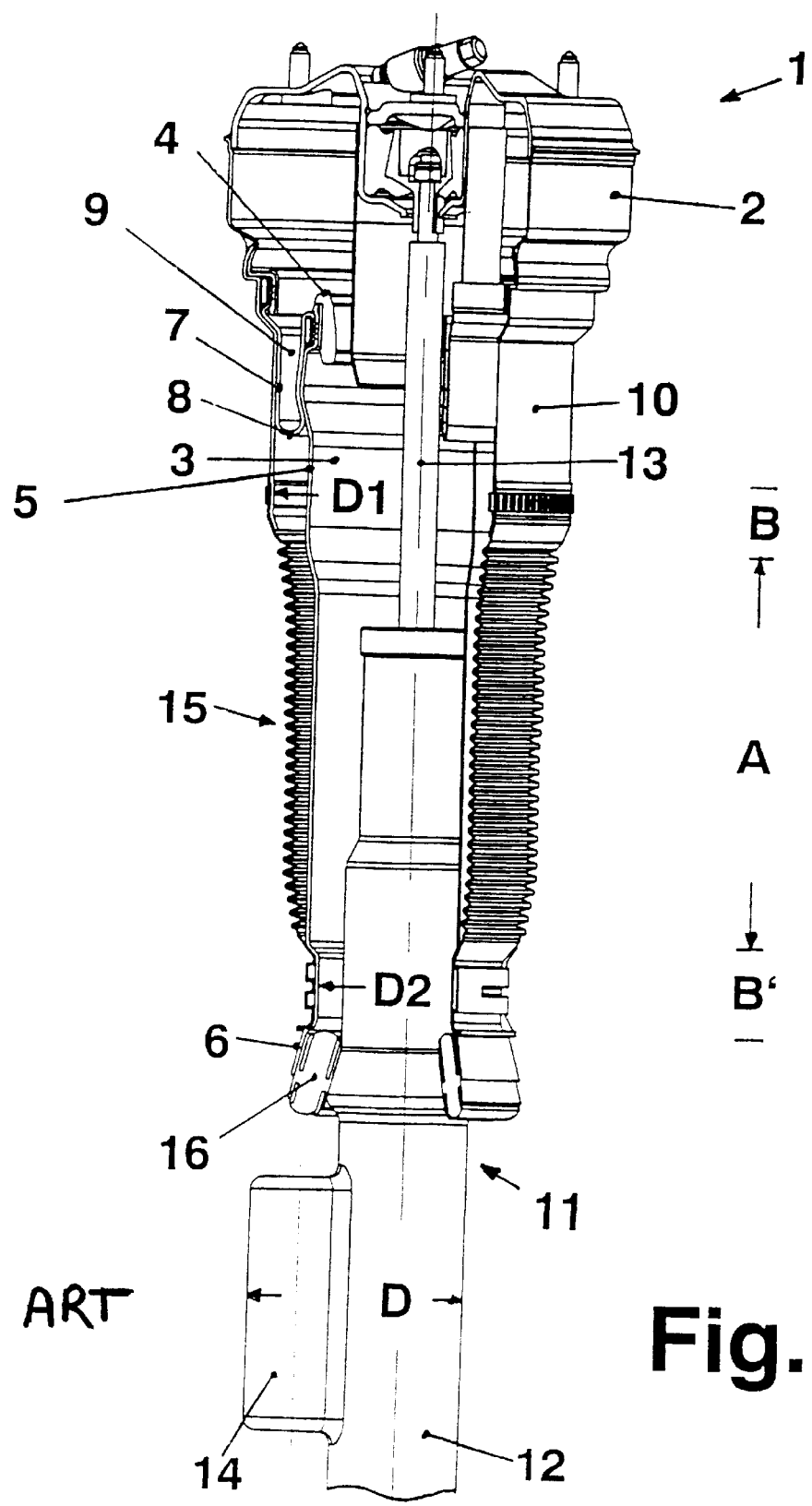

A pneumatic spring system of this type comprising a pneumatic spring cover, a pneumatic spring piston and a pneumatic spring bellows as importatnt structural components of the pneumatic spring module, is described, for example in published patent document DE-A-197 53 637 (FIG. 1). The system comprises the use of a vibrantion damper (shock absorber), a backpack module and of a protective sleeve, whereby the additional components are introduced in greater detail in the following.

The vibration damper comprises a container tube and a piston rod that is connected with the core area of the pneumatic spring cover in a fixed manner and immerses in the container tube in a sliding way. The vibration damper is frequently provided with a backpack module in particular in the form of an ADS-module (adaptive damping system), which projects beyond the outer periphery of the end zone of the pneumatic spring piston sideways. Reference is supplementarily made in this regard to published document DE-A-198 26 480 (FIG. 1).

The hose-shaped protective sleeve comprises a fold-like center component as well as a first connection area and a second connection area, where the associated structural components of the pneumatic spring are secured as well. In the exemplified embodiment according to DE-A-197 53 637 (FIG. 1), the first connection area is connected there with the pneumatic spring cover, whereas the second connection area is secured on the end area of the pneumatic spring piston.

In conjunction with the pneumatic spring systems known to date, the protective sleeve of the standard design can be mounted only before the vibration damper is installed because the inside diameter of its second connection area is too narrow for it to be pushed over the backpack module ADS-module), whereas its first connection area has an adequate inside diameter in that respect in most cases.

Now, the problem of the invention is to provide a replacement sleeve, taking into account the fact that the vibration damper cannot always be separated from the pneumatic spring module for repairs. Furthermore, the protective sleeve is to be usable also as a series (original euipment) sleeve.

The problem is solved according to the invention in that
the inside diameter of the first and the second connection areas of the protective sleeve is sufficiently large for the protective sleeve to be pushed over the backpack module, whereby
the excess clear space within the second connection area of the protective sleeve can be filled with an adapter element in a compensating manner, whereby the adapter element can be closed by means of a closing system so as to form a ring-shaped structure that extends around the end part of the pneumatic spring piston and/or the container tube.

Useful developments of the invention are specified herein.

Figure 2:
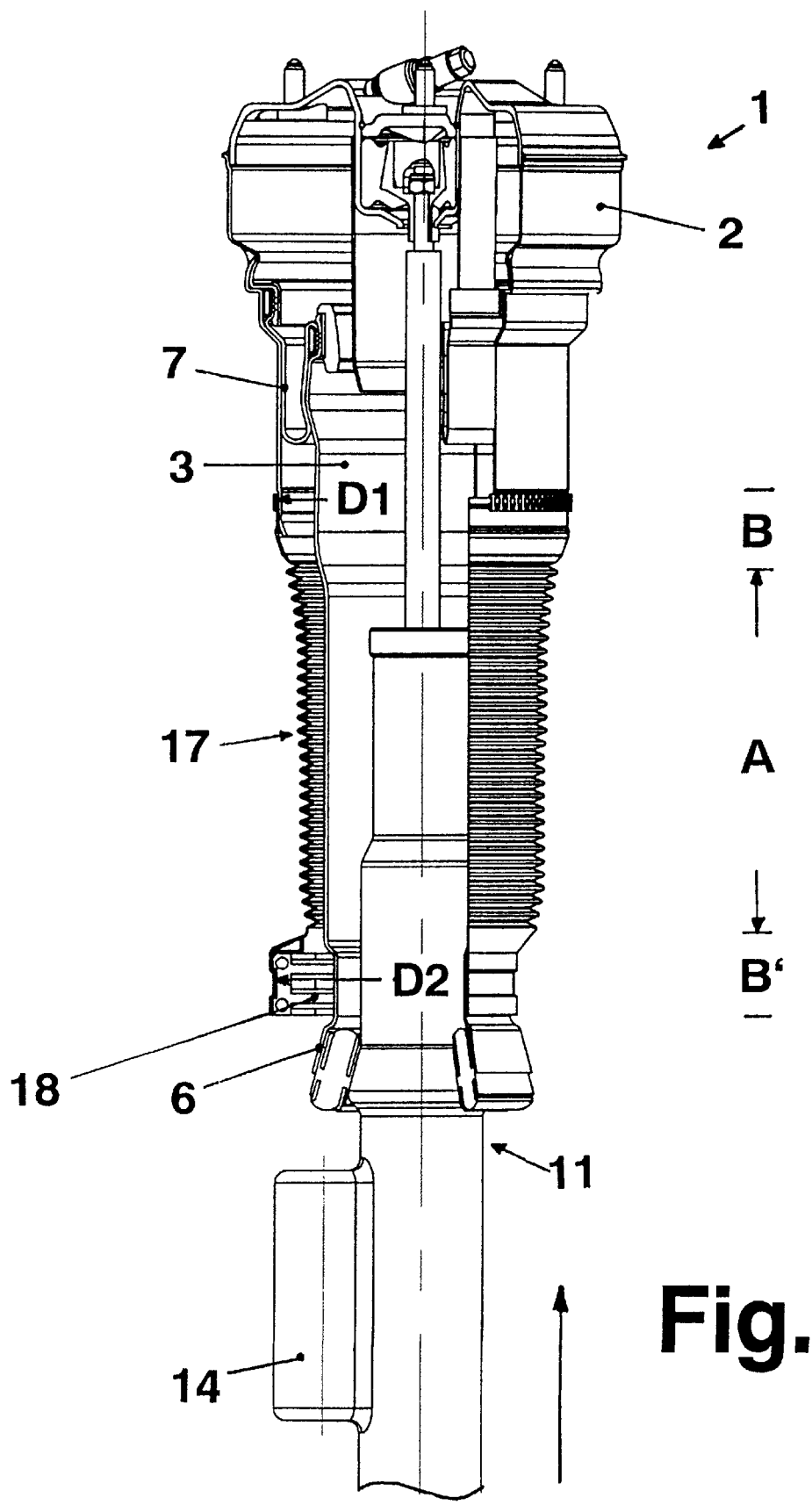
Figure 3:
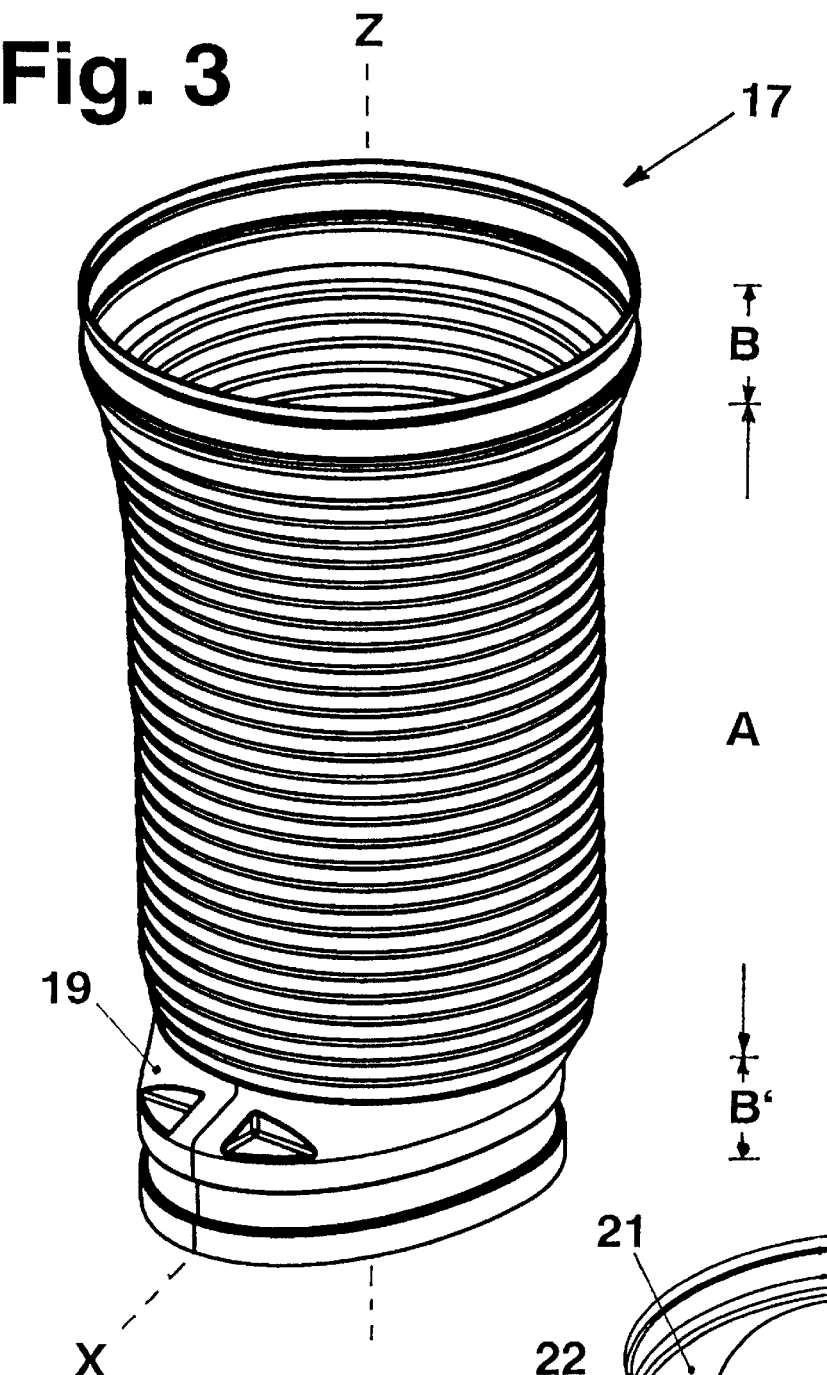
Figure 4:
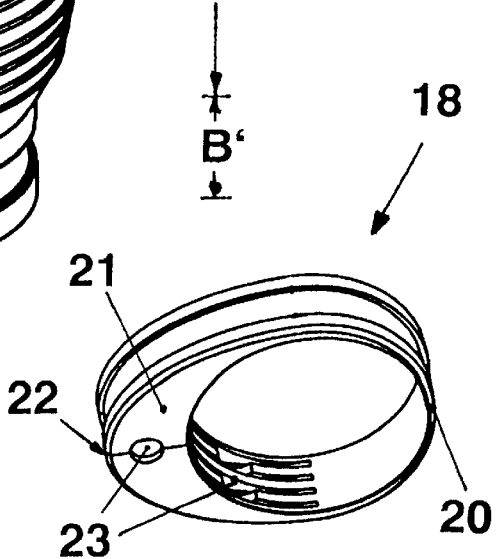
Figures 5, 6:
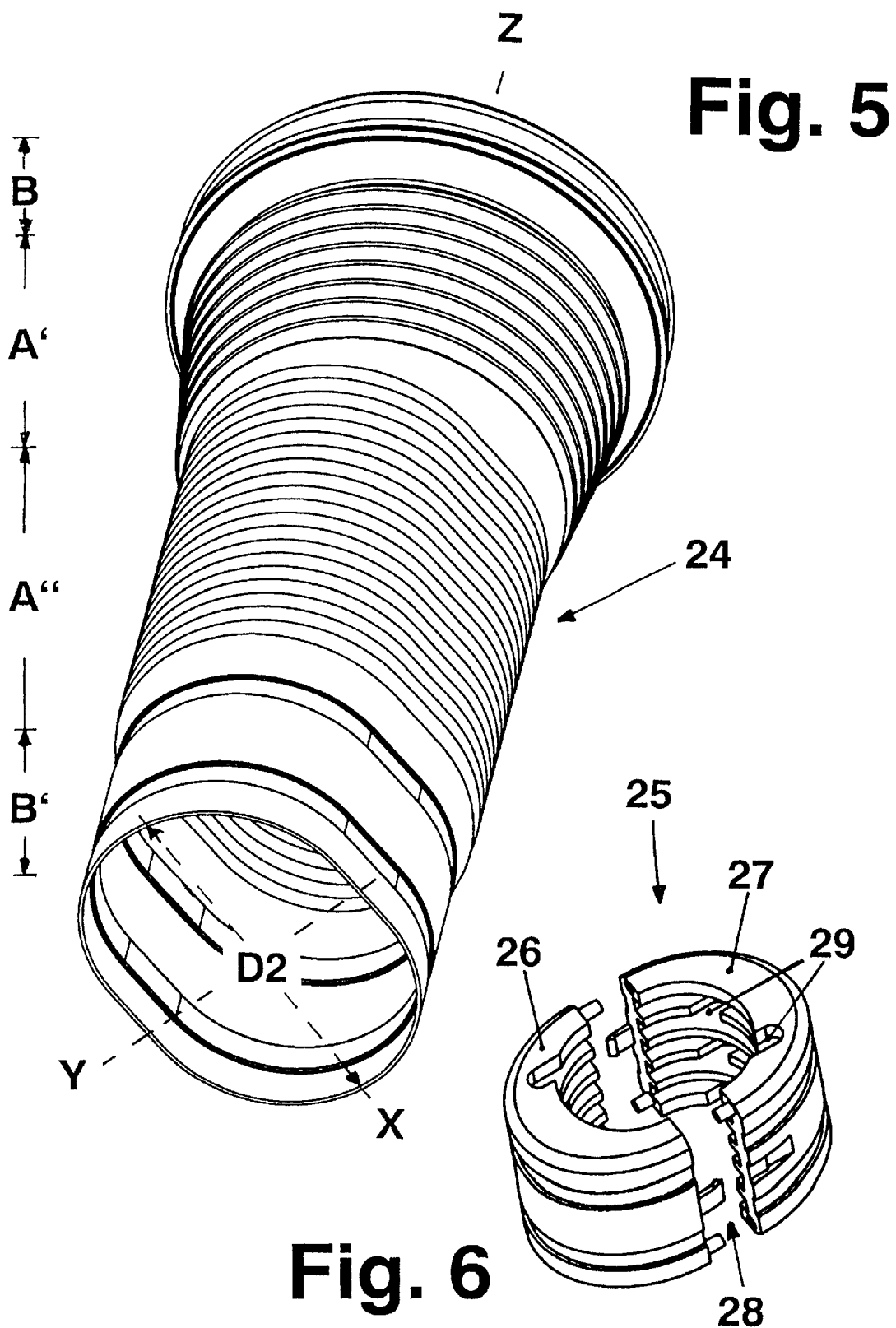

The invention is now described in greater detail in the following with the help of exemplified embodiments and by reference to schematic drawings, in which:

FIG. 1 shows a pneumatic spring system with a protective sleeve according to the state of the art.
FIG. 2 shows a pneumatic spring system with a protective sleeve as defined by the invention.
FIG. 3 shows a detail representation of the protective sleeve according to FIG. 2.
FIG. 4 shows an advantageous adapter element for a protective sleeve according to FIG. 3.
FIG. 5 shows another exemplified embodiment of a protective sleeve as defined by the invention; and
FIG. 6 shows an advantageous adapter element for a protective sleeve according to FIG. 5.

The following list of reference symbols is applicable in conjunction with the above figures:
1 Pneumatic spring system
2 Pneumatic spring cover (pressure container with valve)
3 Pneumatic spring piston (roll-off piston, immersion piston)
4 Face area of pneumatic spring piston
5 Roll-off surface of pneumatic spring piston
6 End zone of pneumatic spring piston
7 Pneumatic spring bellows made of elastomer material
8 Rolling fold of pneumatic spring bellows
9 Interior space of pneumatic spring
10 Outer guide
11 Vibration damper
12 Container tube
13 Piston rod
14 Backpack module (ADS-module)
15 Protective sleeve
16 Piston receptacle
17 Protective sleeve
18 Adapter element (adapter bush)
19 Overhang of second connection area
20 Thin-walled bush part with film hinge
21 Thick-walled bush part with closing system
22 Closing system
23 Labyrinth system
24 Protective sleeve
25 Adapter element (adapter bush)
26 Semi-cup (semi-bush)
27 Semi-cup (semi-bush)
28 Closing system
29 Labyrinth system
A Fold-shaped center part of protective sleeve (rotation-symmetrical)
A' Fold-shaped center part of protective sleeve (rotation-symmetrical)
A" Fold-shaped center part of protective sleeve (not rotation-symmetrical)
B First connection area of protective sleeve (rotationsymmetrical)
B' Second connection area of protective sleeve (not rotation-symmetrical)
D Maximum diameter of container tube of vibration damper within zone of backpack module (ADS-module)
D1 Inside diameter of first connection area of protective sleeve
D2 Inside diameter of second connection area of protective sleeve
X Mirror plane
Y Mirror plane
Z Center axis.

FIG. 1 shows a pneumatic spring system 1 for the front axle of a motor vehicle. The important structural components of the pneumatic spring module are the pot-shaped pneumatic spring cover 2, the pneumatic spring piston 3, its face area 4, which is disposed opposite the pneumatic spring cover, as well as the pneumatic spring bellows 7. The pneumatic spring bellows connects here the pneumatic spring cover and the pneumatic spring piston, using fastening means (e.g. clamping rings), with enclosure of an interior space 9 of the pneumatic spring, said space having an elastic volume. When the pneumatic spring bellows is compressed, a rolling fold 8 is formed, which is capable of rolling off on the roll-off surface 5 of the pneumatic spring piston.

In most cases, the pneumatic spring bellows 7 is provided with an embedded reinforcement in the form of an axial bellows (DE-A-36 43 073; FIG. 1) or a cross-layered bellows (DE-A-29 04 522; FIG. 2). An axial bellows equipped with an outer guide 10 is employed in the pneumatic spring system 1.

Furthermore, the pneumatic spring system 1 has a vibration damper 11, which comprises a container tube 12 and a piston rod 13. The piston rod is connected with the core area of the pneumatic spring cover 2 in a fixed manner and immerses in the container tube in a sliding way. A backpack module 14 in the form of an ADS-module projects beyond the periphery of the end area 6 of the pneumatic spring piston 3, forming thereby a maximum outer diameter D of the container tube.

Furthermore, the pneumatic spring system 1 is equipped with a hose-shaped protective sleeve 15 made of elastomer material, thermoplastic elastomer (TPE), or a thermoplastic. The protective sleeve comprises here a fold-shaped center part A, a first connection area B with an inside diameter D1, and a second connection area B' with an inside diameter D2. The first connection area B is secured on the outer side of the lower end of the outer guide 10 by means of a clamp. The second connection area B', which is located between the backpack module 14 and the first connection area B, is connected with the end zone 6 of the pneumatic spring piston 3, namely with direct contact with the pneumatic spring piston, whereby the fastening is established, for example with a pipe clamp, within a tapered part of the piston. The function of the protective sleeve is to prevent dirt from penetrating the dynamic zone of the pneumatic spring bellows 7.

The end zone 6 of the pneumatic spring piston 3 sits on a piston receptacle 16, which at the same time forms a sealing connection between the pneumatic spring piston and the container tube 12 of the vibration damper 11. Conditioned by another construction within the end zone of the pneumatic spring piston, for example in a form such that the pneumatic spring piston and the container tube jointly form one single unit, it is possible also to secure the second connection area B' of the protective sleeve 15 on the container tube or within the zone of transition between the pneumatic spring piston and the container tube.

Now, if in connection with the pneumatic spring system 1, the protective sleeve 15 as a standard (original equipment) sleeve gets damaged, it can be cut open with the help of a cutting tool, for example with a cutter knife, and removed; however, it cannot be replaced by simply pushing on a replacement sleeve because the inside diameter D2 of the second connection area B' of the protective sleeve is smaller than the maximum outer diameter D of the container tube 12 within the zone of the ADS-module 14. On the other hand, the inside diameter D1 of the first connection area B of the protective sleeve suffices in most cases. Therefore, the pneumatic spring module would have to be separated in order to be able to mount the replacement sleeve. It has to be noted in this connection that such separation is not always possible in a simple manner.

Now, FIG. 2 shows a pneumatic spring system 1 based on the same construction design principle. However, what has changed versus the pneumatic spring system 1 according to FIG. 1 is the protective sleeve 17, specifically exclusively within its second connection area B'. The inside diameter D2 of the connection area B' is now adequately large for the protective sleeve as a replacement sleeve to be pushed over the ADS-module 14 in the direction of the arrow. The constructional obstacle thus can be overcome without problems.

Since nothing has changed on the outer contour of the end zone 6 of the pneumatic spring piston 3, an excess clear space is created because the second connection area B' of the protective sleeve 17 is no longer directly connected with the pneumatic spring piston. The excess clear space is now filled with an adapter element 18. As with the pneumatic spring system according to FIG. 1, clamping is achieved by means of a pipe clip in such a way that the assembly is safely secured against turning.

FIG. 3 again shows details of the protective sleeve 17 according to FIG. 2. The first connection area B and the fold-shaped center part A are substantially designed rotation-symmetrically based on the center axis Z. However, the second connection area B', on the other hand, is not provided with an axis of rotation-symmetry. Based on the circumferential direction, it has a substantially ellipsoidal shape, with formation of a maximum inside diameter D2 (FIG. 2). The second connection area B' is in this connection eccentrically balanced sideways, with formation of an overhang 19, in a manner such that only one mirror plane X is present.

FIG. 4 shows an advantageous adapter element 18 for the second connection area B' of the protective sleeve 17 according to FIG. 3. The bush-shaped adapter element, which is preferably made of plastic or from an elastomer material (molded rubber component), is an individual structural component in the present case, specifically in the form of a thin-walled bush component 20 with a film hinge, and a thick-walled bush component 21, where the closing system 22 is located. A ring-shaped structure can be produced with the help of said closing system, for example by means of a snap-in type locking system. Furthermore, on its inner side, the adapter element is provided with a labyrinth system 23, which provides for air-flow compensation.

FIG. 5 shows a protective sleeve 24 for the rear axle of a motor vehicle. The first connection area B and the center part A' adjoining it, in whose zone the pneumatic spring bellow is rolling off, are designed substantially rotation-symmetrically in the present case as well, namely based on the center axis Z. However, the connection area B' without overhang, which is free of any balancing, and also the center part A" adjoining said area, are not provided with an axis of rotation-symmetry. Based on the circumferential direction, the two sleeve areas A" and B' have a substantially oval-shaped contour, with formation of a maximum inside diameter D2 in the two mirror planes X and Y. Such a construction of the protective sleeve can be pushed over the ADS-module 14 (FIG. 2) in the direction of the arrow as well.

Now, FIG. 6 shows an advantageous adapter element 25 for the second connection area B' of the protective sleeve 24 according to FIG. 5. In the present case, the bush-shaped adapter element consists of the two identical semi-cups 26 and 27 made of plastic, elastomer material (molded rubber component) or metal, which can be plugged together by means of a closing system 28 so as to form a ring-shaped structure, namely by means of plug naps and locking arms. Furthermore, the adapter element is provided with a labyrinth system 29 that provides for air-flow compensation.

The protective sleeves 17 (FIGS. 2, 3) can be used both as replacement sleeves and standard (original equipment) sleeves.

What is claimed is:

1. A pneumatic spring system comprising:
   (a) a pneumatic spring cover;
   (b) a pneumatic spring piston comprising:
      (i) a face area arranged opposite said pneumatic spring cover;
      (ii) a lateral roll-off surface; and
      (iii) an end zone on an end of said piston farthest removed from the face area;
   (c) a pneumatic spring bellows connecting said pneumatic spring cover and said pneumatic spring piston with each other;
   (d) a vibration damper comprising:
      (i) a container tube; and
      (ii) a piston rod connected with a core area of said pneumatic spring cover and slidably immersible in the container tube;
   (e) at least one backpack module projecting sideways beyond an outer periphery of the end zone of said pneumatic spring piston and arranged laterally on the container tube to form with the container tube a maximum outer diameter;
   (f) a protective sleeve comprising
      (i) a fold-shaped center part;
      (ii) a first connection area having a first inside diameter, said first connection area being secured to a portion of the pneumatic spring system other than said pneumatic spring piston or said vibration damper; and
      (iii) a second connection area having a second inside diameter, said second connection area being connected with the end zone of the pneumatic spring piston or the container tube or both, being located between the backpack module and the first connection area, and not being rotation-symmetrical with respect to a center axis of said protective sleeve;
   wherein said first and second inside diameters have a size so that said protective sleeve can be pushed over said backpack module, the excess clear space within said second circumferential direction, with formation of a maximum inside diameter connection area can be filled with an adapter element in a compensating manner, and the adapter element can be closed by a closing system to form a ring-shaped structure extending around the end zone of the pneumatic spring piston or the container tube or both.

2. The pneumatic spring system according to claim 1, wherein the first connection area of the protective sleeve is substantially rotation-symmetrical with respect to the center axis.

3. The pneumatic spring system according to claim 1, wherein the second connection area of the protective sleeve has a substantially ellipsoidal or oval shape based on the circumferential direction, with formation of a maximun inside diameter.

4. The pneumatic spring system according to claim 3, wherein the second connection area of the protective sleeve is eccentrically balanced sideways, forming an overhang so that at most only one mirror plane is present.

5. The pneumatic spring system according to claim 3, wherein the second connection area of the protective sleeve is free of balancing and has two mirror planes.

6. The pneumatic spring system according to claim 1, wherein the entire center part of the protective sleeve is substantially rotation-symmetrical with respect to the center axis.

7. The pneumatic spring system according to claim 1, wherein the adapter element comprises two semi-cups (26, 27) that can be plugged together by said closing system to form the ring-shaped structure.

8. The pneumatic spring system according to claim 1, wherein on the inner side, the adapter element is provided with a labyrinth system providing for air-flow compensation.

9. The pneumatic spring system according to claim 1, wherein the adapter element is made of plastic.

10. The pneumatic spring system according to claim 1, wherein the adapter element is made of elastomer material.

11. The pneumatic spring system according to claim 1, wherein the adapter element is made of metal.

12. The pneumatic spring system according to claim 1, wherein:
   (a) said pneumatic spring cover has the shape of a pot;
   (b) said pneumatic spring bellows is made of elastomer material and is provided with an embedded reinforcement in the form of an axial or cross-layered bellows; and
   (c) said at least one backpack module is in the form of an ADS-module.

13. The pneumatic spring system according to claim 12 wherein said embedded reinforcement is in the form of an axial bellows with an outer guide and said first connection area is secured on said pneumatic spring cover or on the outer guide.

14. A pneumatic spring system comprising:
   (a) a pneumatic spring cover;
   (b) a pneumatic spring piston comprising:
      (i) a face area arranged opposite said pneumatic spring cover;
      (ii) a lateral roll-off surface; and
      (iii) an end zone on an end of said piston farthest removed from the face area;
   (c) a pneumatic spring bellows connecting said pneumatic spring cover and said pneumatic spring piston with each other;
   (d) a vibration damper comprising:
      (i) a container tube; and
      (ii) a piston rod connected with a core area of said pneumatic spring cover and slidably immersible in the container tube;
   (e) at least one backpack module projecting sideways beyond an outer periphery of the end zone of said pneumatic spring piston and arranged laterally on the container tube to form with the container tube a maximum outer diameter;
   (f) a protective sleeve comprising
      (i) a fold-shaped center part;
      (ii) a first connection area having a first inside diameter, said first connection area being secured to a portion of the pneumatic spring system other than said pneumatic spring piston or said vibration damper; and
      (iii) a second connection area having a second inside diameter, said second connection area being connected with the end zone of the pneumatic spring piston or the container tube or both and being located between the backpack module and the first connection area;
   wherein said first and second inside diameters have a size so that said protective sleeve can be pushed over said backpack module, the excess clear space within said second connection area can be filled with an adapter element in a compensating manner, and the adapter element can be closed by a closing system to form a ring-shaped structure extending around the end zone of the pneumatic spring piston or the container tube or both; and wherein a first portion of said center part facing said first connection area is substantially rotation symmetrical with respect to a center axis of said protective sleeve and a second portion of said center part facing said second connection area has a substantially ellipsoidal or oval circumference.

15. A pneumatic spring system comprising:

(a) a pneumatic spring cover, (b) a pneumatic spring piston comprising:
   (i) a face area arranged opposite said pneumatic spring cover;
   (ii) a lateral roll-off surface; and
   (iii) an end zone on an end of said piston farthest removed from the face area;

(c) a pneumatic spring bellows connecting said pneumatic spring cover and said pneumatic spring piston with each other;

(d) a vibration damper comprising:
   (i) a container tube; and
   (ii) a piston rod connected with a core area of said pneumatic spring cover and slidably immersible in the container tube;

(e) at least one backpack module projecting sideways beyond an outer periphery of the end zone of said pneumatic spring piston and arranged laterally on the container tube to form with the container tube a maximum outer diameter;

(f) a protective sleeve comprising
   (i) a fold-shaped center part;
   (ii) a first connection area having a first inside diameter, said first connection area being secured to a portion of the pneumatic spring system other than said pneumatic spring piston or said vibration damper; and
   (iii) a second connection area having a second inside diameter, said second connection area being connected with the end zone of the pneumatic spring piston or the container tube or both and being located between the backpack module and the first connection area;

wherein said first and second inside diameters have a size so that said protective sleeve can be pushed over said backpack module, the excess clear space within said second connection area can be filled with an adapter element in a compensating manner, and the adapter element can be closed by a closing system to form a ring-shaped structure extending around the end zone of the pneumatic spring piston or the container tube or both; and wherein the adapter element is in the form of a thin-walled bush component with a film hinge and a thick-walled bush component where the closing system is located to assist in producing the ring-shaped structure.

\* \* \* \* \*

UNITED STATES PATENT AND TRADEMARK OFFICE
CERTIFICATE OF CORRECTION

PATENT NO. : 6,460,665 B1
DATED : October 8, 2002
INVENTOR(S) : Harald Götz et al.

It is certified that error appears in the above-identified patent and that said Letters Patent is hereby corrected as shown below:

Column 5,
Lines 39-40, after the words "said second", please delete "circumferential direction, with formation of a maximum inside diameter".

Signed and Sealed this

Twenty-ninth Day of July, 2003

JAMES E. ROGAN
*Director of the United States Patent and Trademark Office*